US012523316B2

(12) United States Patent
Heidebrecht et al.

(10) Patent No.: US 12,523,316 B2
(45) Date of Patent: Jan. 13, 2026

(54) ELECTROMECHANICAL ACTUATOR AND ACTUATOR-VALVE UNIT

(71) Applicant: Thomas Magnete GmbH, Herdorf (DE)

(72) Inventors: Artur Heidebrecht, Derschen (DE); Martin Engelberth, Daaden (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 18/791,241

(22) Filed: Jul. 31, 2024

(65) Prior Publication Data

US 2025/0043882 A1 Feb. 6, 2025

(30) Foreign Application Priority Data

Jul. 29, 2024 (DE) .......................... 102024121467.8

(51) Int. Cl.
 *F16K 31/04* (2006.01)
(52) U.S. Cl.
 CPC .................................. *F16K 31/047* (2013.01)
(58) Field of Classification Search
 CPC ........ F16K 31/047; F16K 31/04; F16K 31/54; F15B 13/044
 See application file for complete search history.

(56) References Cited

U.S. PATENT DOCUMENTS

| 1,678,202 | A | * | 7/1928 | Shivers | F16K 31/047 |
| | | | | | 310/91 |
| 2,656,679 | A | * | 10/1953 | Morey | F16K 31/163 |
| | | | | | 251/59 |
| 2017/0138154 | A1 | * | 5/2017 | Burdick | E21B 43/12 |
| 2020/0340501 | A1 | * | 10/2020 | Niklaus | H02K 11/33 |
| 2021/0207627 | A1 | * | 7/2021 | Biwersi | F15B 15/06 |
| 2023/0375015 | A1 | * | 11/2023 | Salah | F15B 13/10 |

FOREIGN PATENT DOCUMENTS

DE 102007031429 A1 1/2009

* cited by examiner

*Primary Examiner* — Patrick C Williams
(74) *Attorney, Agent, or Firm* — Harness, Dickey & Pierce, P.L.C.

(57) ABSTRACT

The invention relates to an electromechanical actuator, comprising a rotor; a stator, which has a recess; and at least one slider element, which is operatively connected to the rotor and is moved by a rotation of the rotor, wherein the slider element projects at least partially into the recess along a radial direction of the stator in the operating and/or idle state of the actuator. The invention also relates to an actuator-valve unit comprising a valve and the electromechanical actuator.

10 Claims, 10 Drawing Sheets

ELECTROMECHANICAL ACTUATOR AND ACTUATOR-VALVE UNIT

CROSS-REFERENCE TO RELATED APPLICATIONS

This application claims the benefit and priority of German Application No. DE 102023120489.0 filed Aug. 2, 2023 and German Application No. DE 102024121467.8 filed Jul. 29, 2024. The entire disclosure of the above applications are incorporated herein by reference.

FIELD

The invention relates to an electromechanical actuator and an actuator-valve unit.

BACKGROUND

This section provides background information related to the present disclosure which is not necessarily prior art.

Conventional actuators, in particular drive devices for control spools of hydraulic valves, such as those known from DE 102007031429 A1, have a rotor and a stator as components of an electric machine. A rotary movement of the motor is usually converted into a linear movement of the control spool by a certain stroke. The motor, i.e. rotor and stator, is located outside the movement space of the spool. In a conventional elongate arrangement, the motor must be offset backwards by the stroke of the spool, i.e. at a greater distance from a connecting surface between the spool and valve or along a stroke direction of the spool. In a vertical arrangement, as shown in DE 102007031429 A1, the motor must be arranged above the spool, i.e. at a greater distance along a vertical extent perpendicular to the longitudinal extent/stroke direction of the spool, or more precisely above the spool along its entire range of movement. However, these arrangements lead to increased sizes of the conventional actuators. This reduces their scalability for higher requirements. In other words, the sizes of the conventional actuators increase disproportionately with higher demands on their force/stroke.

SUMMARY

This section provides a general summary of the disclosure, and is not a comprehensive disclosure of its full scope or all of its features.

It is the object of the invention to provide an electromechanical actuator and an actuator-valve unit which have a smaller size and scalability.

This object is achieved in particular by an electromechanical actuator. The actuator has a rotor, a stator and at least one slider element. The slider element is operatively connected to the rotor and is moved by rotation of the rotor. The stator has a recess, with the slider element projecting at least partially into the recess of the stator along a radial direction of the stator during operation and/or in the idle state of the actuator.

The fact that the stator has a recess and the slider element protrudes at least partially and at least temporarily through the recess ensures a compact design of the actuator.

In some embodiments, the stator has a complete cut-out as the aforementioned recess, in which the stator is completely interrupted along its circumferential direction. In alternative embodiments, the aforementioned cut-out is a partial cut-out, for example a (non-full) slot or a (radial) through-hole in the stator. In the partial recess, remaining structures of the stator along the circumferential direction of the stator can, for example, be set up to close the magnetic circuit, for example as webs with magnetizable material and/or as a base plate with magnetizable material, and/or to ensure greater structural stability of the stator, for example as stiffening structures, which also comprise, for example, magnetizable material.

As explained above, the slider element projects "along a radial direction of the stator into the recess of the stator". In this context, a radial direction of the stator is defined as a direction (or many directions) that runs from the inside to the outside of the stator. The slider element extends along a radial direction so that the slider element projects from the inside to the outside (of the stator) towards the recess. In this context, "along a radial direction" includes all directions that run from the inside to the outside of the stator, in particular directions that run parallel or coaxial to radii and from the inside to the outside of the stator.

For example, in some embodiments, the slider element is offset from the centre of the stator, for example forming a secant with a circumference of the stator.

In some embodiments, the slider element protrudes at least partially into the recess in the radial direction. In other words, in such examples, the slider element is aligned coaxially with a radius of the stator.

The slider element protrudes at least partially into the recess along a radial direction of the stator when the actuator is idle and in operation.

In an embodiment, the stator is rotationally asymmetrical with respect to an axis of rotation of the rotor. In this case, the stator is rotationally symmetrical with respect to the axis of rotation of the rotor, except for the presence of the recess. The stator is substantially annular, in particular circular ring-shaped, wherein the recess is slot-shaped, so that the stator as a whole is substantially slotted ring-shaped. This allows the stator to be easily adapted to the requirements of the slider element, for example the thickness or length of the slider element, by adjusting the size of the recess or slot.

The rotor is rotationally symmetrical in relation to its axis of rotation. The rotor is circular. In particular, the rotor does not have a recess which is equivalent to the recess of the stator or is formed at an equivalent point of the rotor (in the idle state) with respect to the stator. The rotor does not have a recess into which the slider element protrudes when the actuator is idle or in operation. This has the particularly effect that forces and resulting vibrations and/or noises, which may be caused by the rotation of the rotor, can be suppressed or avoided as easily as possible by the symmetrical design of the rotor.

In an embodiment, the stator has a plurality of stator teeth. The stator teeth are evenly distributed along a circumferential direction of the stator, wherein the stator has no stator tooth in the recess. In other words, the recess is an omission of at least one stator tooth. This ensures particularly simple manufacture of the stator, as only one or more stator teeth need to be omitted.

In an embodiment, the actuator has a base plate. The stator teeth are preferably arranged on the base plate. The base plate is designed to hold the stator teeth and in some embodiments has retaining structures for this purpose. The base plate is annular. The base plate is part of the stator. In alternative embodiments, the base plate is part of a housing or, for example, part of the aforementioned rotor or another rotor.

The base plate is designed to close a magnetic circuit of the stator teeth.

In a further embodiment, a connection between the rotor and the slider element is set up to convert a rotation of the rotor during operation of the actuator into a radial back-and-forth movement of the slider element through the recess. As a result, a stroke, in particular a translatory movement, of the slider element is at least partially radial within the stator, so that a compact size of the actuator is achieved. In this context, a radial back-and-forth movement or a radial stroke of the slider element is a movement/stroke of the slider element that runs from the inside to the outside of the stator ("back" movement) and from the outside to the inside of the stator ("forth" movement). This does not necessarily have to be coaxial with a radius of the stator, but it can be.

In an alternative embodiment, a connection between the rotor and the slider element is set up to convert a rotation of the rotor during operation of the actuator into a back-and-forth movement of the slider element through the recess, which is perpendicular to the radial direction. The connection can effect a back-and-forth movement of the slider element along the circumferential direction of the stator. Alternatively or additionally, the connection can effect a back-and-forth movement of the slider element along a longitudinal direction of the stator, wherein the longitudinal direction of the stator is perpendicular to the radial direction, perpendicular to the circumferential direction and preferably parallel to the axis of rotation of the rotor. For these embodiments, the actuator has, for example, a deflection, in particular by means of a deflection gear. As a result, the actuator can be used in a variety of applications.

In the embodiment with the radial back-and-forth movement of the slider element, the rotor has a rotor gearwheel. The slider element has a rack which is connected to the rotor gearwheel. As a result, a rotation of the rotor is converted into a rotation of the rotor gearwheel in a compact and simple manner.

In an embodiment, teeth of the rack of the slider element engage directly in teeth of the rotor gearwheel, so that the rack is moved back-and-forth through the recess of the stator by a rotation of the rotor along a radial direction, in particular coaxially with a radius. This results in a particularly compact and simple design of the connection between the rotor and the slider element.

In embodiments, the rack of the slider element is connected to the rotor gearwheel by a gearing. Various types of gearings, in particular toothed gearings, can be used here, in particular depending on the requirements, for example for a deflection of the stroke direction. Spur gearings and planetary gearings are particularly advantageous.

In some embodiments, in which the gearing is, for example, a spur gearing, such a spur gearing is designed as a multi-stage spur gearing.

In an alternative embodiment, the rack of the slider element is connected to the rotor gearwheel by means of a planetary gearing. In other words, the actuator has a planetary gearing that connects the slider element to the rotor.

In a particularly embodiment, the rotor and the stator form a radial flux machine in which the rotor is arranged radially inside the stator. The stator, with reference to its recess, partially encloses the rotor along its circumferential direction. This allows a particularly simple and compact design (low height) of the actuator, especially along the longitudinal direction.

The aforementioned radial flux machine is combined with the embodiment of the connection as a planetary gearing or as a direct connection of the rotor gearwheel to the slider element.

In the possible combination of the radial flux machine with the planetary gearing, the rotor has a substantially semi-closed hollow-cylindrical shape (which can also be characterized as a hollow cylinder with a lid, without a base), wherein an outer surface of the rotor holds rotor magnets. The rotor has the rotor gearwheel in its radial centre on its inner side. In other words, the rotor has the rotor gearwheel radially centred on its inner surface of the lid.

In an alternative embodiment, the rotor and the stator form an axial flux machine in which the rotor is arranged on the stator along its axis of rotation. In other words, the rotor is arranged on the stator along the longitudinal direction of the stator, in particular arranged directly on the stator.

The aforementioned axial flux machine is combined with the embodiment of the connection as a planetary gearing or as a spur gearing or as a direct connection between the rotor gearwheel and the slider element.

A combination of the axial flux machine with the embodiment of the connection as a spur gearing, in particular a multi-stage spur gearing, is particularly advantageous. The spur gearing is arranged, in particular completely, in the space partially enclosed by the stator. This reduces the size of the entire actuator. Furthermore, the power density is increased by adapting the operating range of the actuator by means of the spur gearing. By increasing the power density, the actuator can be used for higher requirements and/or can be used for a larger application range (smaller available spaces) with the same requirements and a smaller size.

In particularly embodiments, the multi-stage spur gearing has a plurality of spur gears. The spur gearing has three or more, or four or more, spur gears. In an embodiment, at least one of the spur gears is a double gear.

In a possible combination of the axial flux machine with the direct connection between the rotor gearwheel and the slider element, the rotor gearwheel is in direct contact with the rack of the slider element and engages with it. The rotor is substantially disc-shaped and has an annular arrangement of rotor magnets on a surface opposite the stator with respect to its longitudinal direction. The rotor magnets are designed in the shape of ring plates, i.e. as a ring that is thin with respect to the longitudinal direction. The rotor gearwheel projects along the longitudinal direction from the surface opposite the stator into a space partially enclosed by the stator in order to reach the rack of the slider element projecting into this stator space through the recess. This embodiment has the particular advantage that the size of the actuator can be reduced, especially perpendicular to the longitudinal direction (length, width).

In particular embodiments, the rotor magnets are individual plate-shaped magnets attached to the outer surface of the rotor casing or ring plate-shaped magnets, as explained above. Alternatively or additionally, the rotor of the radial flux machine or the axial flux machine can have a spoke design of rotor magnets (rotor pack with inserted/buried permanent magnets).

The invention also relates to an actuator-valve unit which solves the above-mentioned problems. The actuator-valve unit has at least one valve and an electromechanical actuator according to the above particular embodiments. The at least one slider element of the actuator is connected to the valve, in particular to a separate valve in each case.

In the explanations above, embodiments were explained with regard to a slider element and a recess in the stator. It is understood that the stator can have a plurality of recesses through each of which a slider element from a plurality of slider elements protrudes. Furthermore, it is possible that several slider elements project together into a single recess or into one recess each from a plurality of recesses in the stator.

Furthermore, the stator can have a plurality of recesses, in particular two, which in particular lie opposite one another with respect to a centre point of the stator or with respect to a longitudinal axis of the slider element. Preferably, the at least one slider element, in particular each slider element, projects along the radial direction of the stator at least partially into the plurality, in particular into both, of the recesses simultaneously or alternately when the actuator is idle and/or in operation.

As a result, the slider element can, for example, mainly protrude through a recess (as explained above) during a positive stroke (or in the idle state) and protrude through a further, second recess and through the first recess in the stator during a negative stroke. In particular, this can prevent the slider element from striking against an inner circumferential surface of the stator during the negative stroke.

As explained above, the slider element protrudes at least partially into the recess of the stator when the actuator is idle and/or in operation. It is particularly advantageous if the idle state defines a state in which the slider element rests at the centre of its entire predefined stroke. With regard to this centre of the stroke, a positive stroke is defined from a radial centre point of the stator in the direction of the recess of the stator, while a negative stroke is defined in the direction from the recess of the stator to the centre point of the stator (against the radial direction, i.e. from the outside to the inside). The positive stroke and the negative stroke do not have to be the same length. In other words, the slider element does not have to rest at the centre of its entire stroke when idle, but preferably rests at a position defined by zero positive stroke and zero negative stroke (±0 mm stroke).

The negative stroke of the slider element can, for example, extend to just before a circumferential side of the stator, which is opposite the recess. Advantageously, "just before" here means an extension of the negative stroke to at least 70% of the radius from the centre of the stator to the corresponding side (opposite the recess), at least 80%, at least 90% or at least 95% of the radius. As a result, a large part of the stroke of the slider element can take place within the stator chamber, so that a particularly compact design of the actuator is ensured. As explained above, the stator can have a further recess (a second recess), which is located opposite the (first) recess explained above on the stator circumference with reference to the stator centre point or with reference to the longitudinal axis of the slider element. It is then possible to extend the negative stroke to equal to or more than 100% of the radius of the stator centre point. For example, the negative stroke can extend up to 105%, preferably 110% or more of the radius.

Further areas of applicability will become apparent from the description provided herein. The description and specific examples in this summary are intended for purposes of illustration only and are not intended to limit the scope of the present disclosure.

BRIEF DESCRIPTION OF DRAWINGS

Further details, advantages and features of the present invention are shown in the following description of exemplary embodiments with reference to the drawing, in which.

Corresponding reference numerals indicate corresponding parts throughout the several views of the drawings.

DETAILED DESCRIPTION

Example embodiments will now be described more fully with reference to the accompanying drawings.

Figure 1:
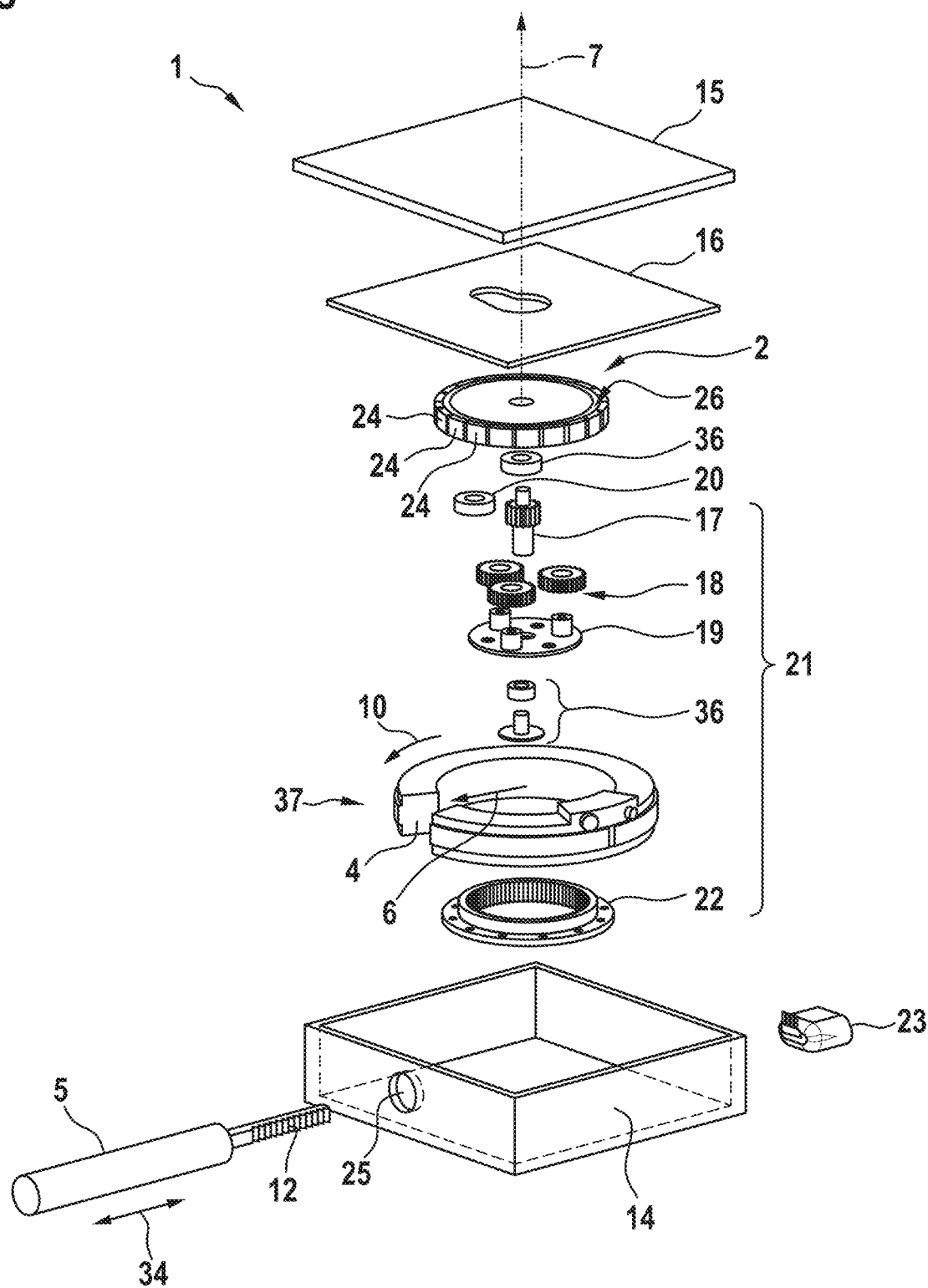
FIG. 1 shows an exploded view of an electromechanical actuator according to a first embodiment of the present invention.
Figure 2:
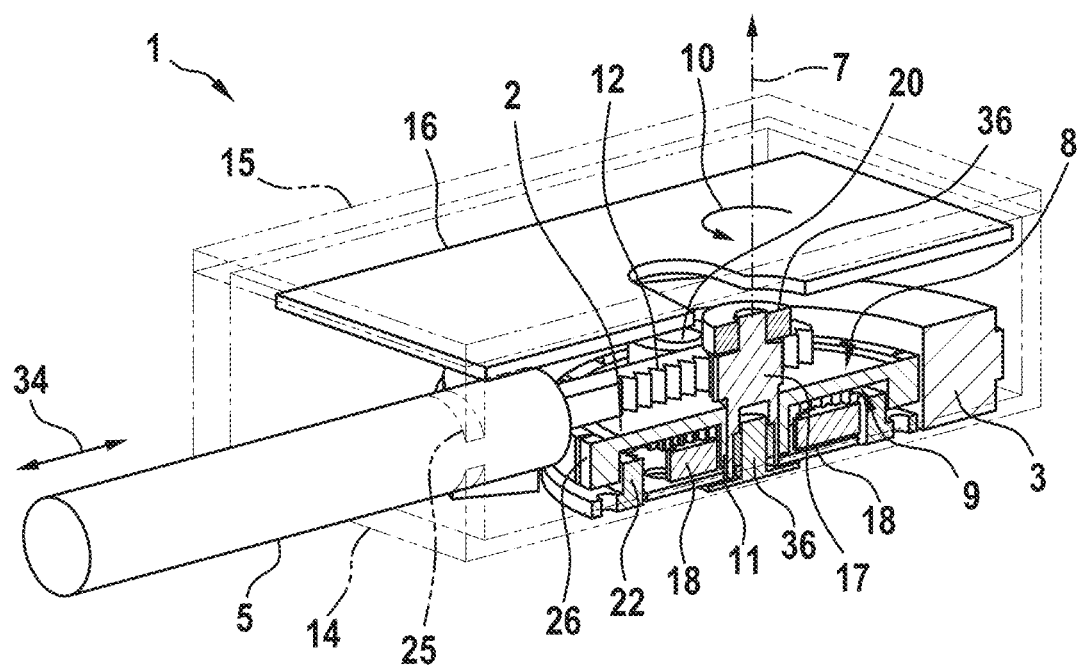
FIG. 2 shows a perspective sectional view of the electromechanical actuator according to the first embodiment of the present invention.
Figure 3:
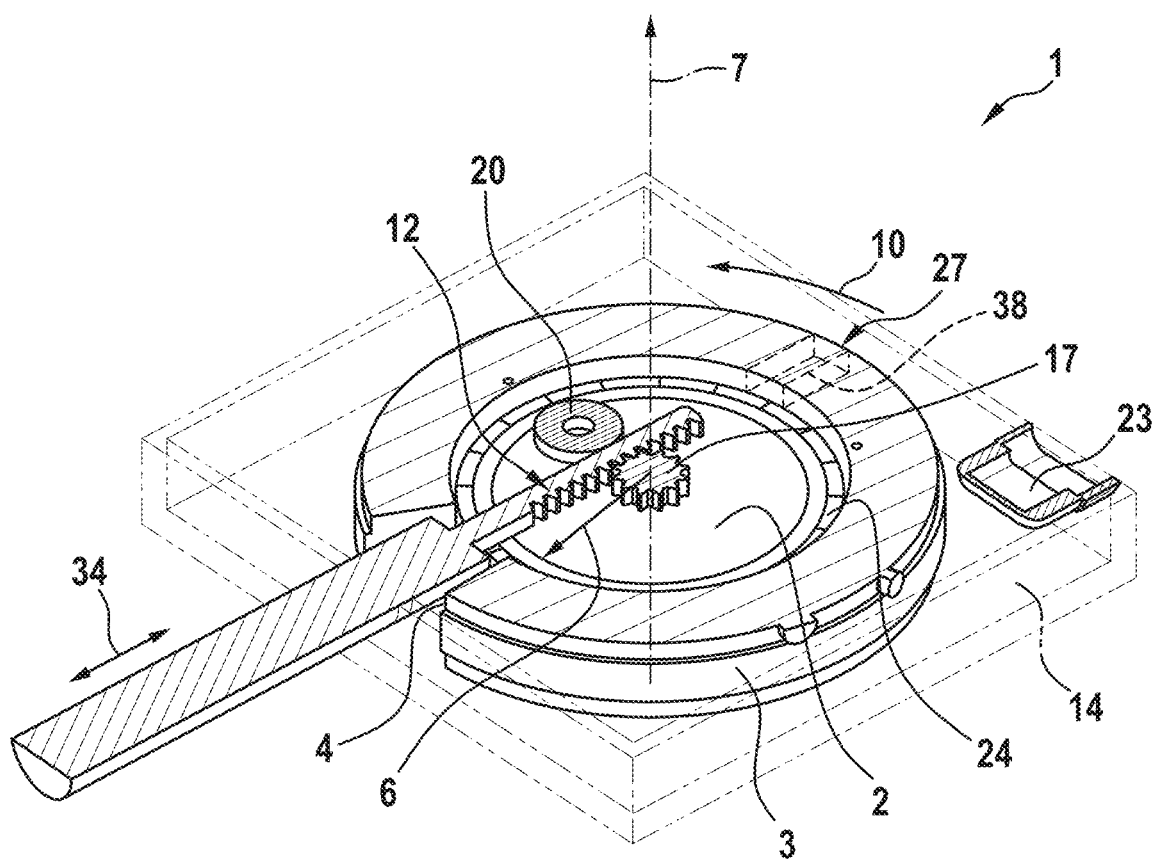
FIG. 3 shows a further perspective sectional view of the electromechanical actuator according to the first embodiment of the present invention.

FIG. 1 shows an exploded view of an electromechanical actuator 1 (hereinafter "actuator 1") according to a first embodiment of the present invention. FIGS. 2 and 3 show sectional views of assembled states of the actuator 1 according to the first embodiment of the present invention.

The actuator 1 according to the present embodiment has a cover 15, a circuit board 16, a rotor 2 with rotor magnets 24, a total of three ball bearings 20, 36, a drive pinion 17, three planetary gears 18, a planet carrier 19, a stator 3, a ring gear 22, a slider element 5 with a rack 12, a device plug 23 and a housing 14 with an opening 25. The ball bearings 20, 36 comprise a counter bearing 20 for the rack 12 (see description below and FIG. 2) and two pinion bearings 36.

In the present embodiment, the rotor 2 and the stator 3 form a radial flux machine in which the rotor 2 is arranged within the stator 3 with respect to a radial direction 6. FIG. 1 is a simplified exploded view. As a comparison with FIG. 2 shows, the rotor 2 is arranged axially between the rack 12 and the ring gear 22 in the assembled state. A single exemplary radial direction 6 is shown in the figures. In this context, "radial direction" is to be understood as any direction that runs from the inside to the outside with respect to the stator 3. Since there are (infinitely) many radial directions 6 in this sense, the indefinite article "a radial direction" is used herein.

The stator 3 has a recess 4. The stator 3 has a slotted ring shape. In other words, the stator 3 has a substantially annular shape with a slot-shaped recess 4. In the assembled state (see FIG. 2 and FIG. 3), the slider element 5 projects along a radial direction 6 of the stator 3 through the recess 4. In other words, the slider element 5 projects from the inside to the outside of the stator 3. As will be described below, the slider element 5 performs a stroke along a radial direction 6. In this embodiment, the slider element 5 performs a reciprocating movement 34 parallel to a radial direction 6. The slider element 5 protrudes through the opening 25 of the housing 14.

The device plug 23 is electrically connected to the circuit board 16, which in turn is electrically connected to the stator 3. The stator 3 is controlled by the device plug 23 and the circuit board 16 and supplies a magnetic field to the rotor magnets 24 of the rotor 2. In this way, the stator 3 causes the rotor 2 to rotate along an axis of rotation 7 of the rotor 2 by the rotor magnets 24. The rotation of the rotor 2 is converted into a rotation of the drive pinion 17 by a planetary gear 21. For this purpose, the planetary gear 21 has the planetary gears 18, the planet carrier 19 and the ring gear 22 in addition to the drive pinion 17. The drive pinion 17 is supported by the pinion bearings 36.

As can be seen in FIG. 2, the rotor 2 also has a rotor gearwheel 11. The rotor 2 is substantially a semi-closed hollow cylinder, to the outer circumferential surface 26 of which the rotor magnets 24 are attached. The outer circumferential surface 26 of the rotor 2 forms an outer surface of the hollow-cylindrical rotor 2. Furthermore, due to the semi-closed shape, the rotor 2 has a cover surface 8, on the inside 9 of which, as shown in FIG. 2, the rotor 2 has the rotor gearwheel 11. In the present case, the rotor gearwheel 11 is formed in one piece, in particular integrally, with the rotor 2.

A rotation of the rotor 2 thus causes a rotation of the rotor gearwheel 11. The rotor gearwheel 11 also causes the planetary gears 18, which are mounted on the planet carrier 19 inside the ring gear 22, to rotate. In the present embodiment, the ring gear 22 is fixed, i.e. it does not rotate. Instead, the planetary gears 18 rotate around the ring gear 22, while the rotor gearwheel 11 acts as a rotatable sun gear of the planetary gearing 21. The rotation of the planetary gears 18 also causes the planet carrier 19 to rotate, whereby the drive pinion 17 connected to the planet carrier 19 is rotated.

The drive pinion 17 is directly connected to the rack 12 of the slider element 5, so that the slider element 5 performs a stroke when the drive pinion 17 is rotated. The rack 12 of the slider element 5 is mounted by means of the counter bearing 20 (see in particular FIG. 3) and pressed against the drive pinion 17. The rack 12 of the slider element 5 is in particular a one-piece, in particular integral, portion of the slider element 5.

A maximum negative stroke, which runs along and in the opposite direction to a radial direction 6 (i.e. from the outside to the inside of the stator 3) from the recess 4 to the opposite side 27 (opposite the recess 4), is predefined in such a way that the rack 12 does not abut against the opposite side 27. For example, the maximum negative stroke is predefined in such a way that it is up to 90% of the distance from a stator centre 35 (centre of the drive pinion 17) to the opposite side 27.

In a particular example, the stroke movement 34 is predefined to ±12.5 mm, so that the total stroke is 25 mm. The slider element 5 is 20 mm thick, for example. In further embodiments, the stroke movement 34 is asymmetrical. The stroke movement 34 can be predefined to +10 mm/−5 mm, for example. Here, "+" means that the rack 12 leaves the stator 12 (left in FIGS. 1-3) and "−" means that the rack 12 is retracted into the stator 12 (right in FIGS. 1-3).

Alternatively, as can be seen from the dashed line in FIG. 3, the stator 2 can have a second recess 38 on the opposite side 27. As a result, the rack 12 can be moved further than the maximum negative stroke explained above, for example up to or more than 100% of the distance from the stator centre 35 to the opposite side 27, i.e. up to the second recess 38 or through the second recess 38 and, for example, even further.

The fact that the stator 3 has the recess 4 means that a large part of the slider element 5 can be accommodated in the stator 3, so that the size of the actuator 1 can be kept small.

It can also be seen that the stator 3 is rotationally asymmetrical with respect to the axis of rotation 7 of the rotor 2 due to the recess 4. The rotor 2 is rotationally symmetrical with respect to its axis of rotation 7.

Figure 4:
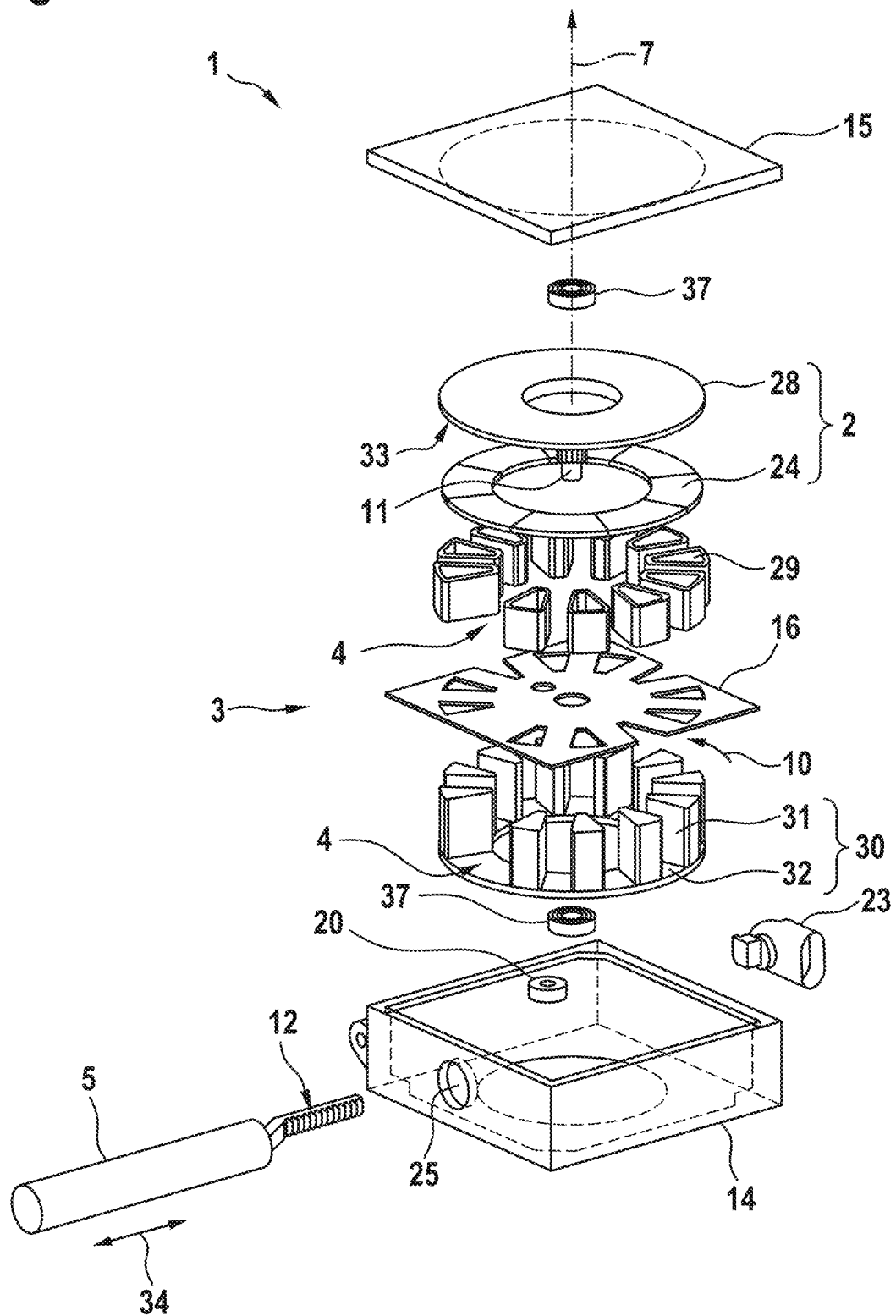
FIG. 4 shows an exploded view of an electromechanical actuator according to a second embodiment of the present invention.
Figure 5:
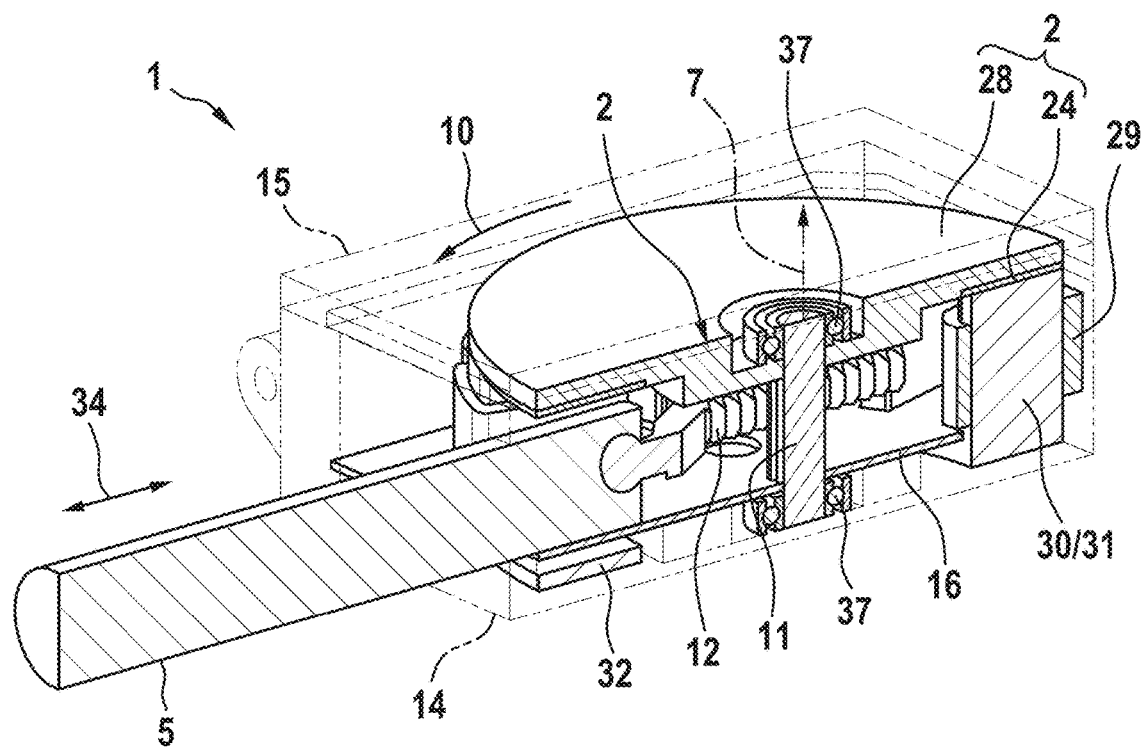
FIG. 5 shows a perspective sectional view of the electromechanical actuator according to the second embodiment of the present invention.
Figure 6:
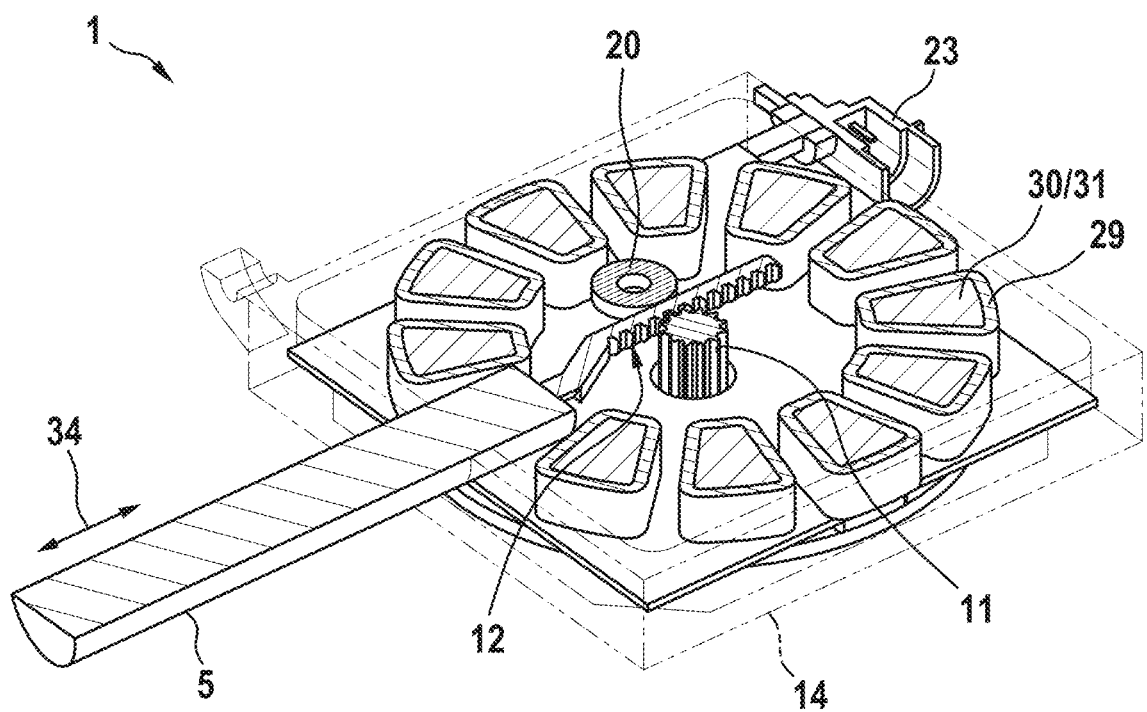
FIG. 6 shows a further perspective sectional view of the electromechanical actuator according to the second embodiment of the present invention.

A second embodiment of the present invention is explained below with reference to FIGS. 4 to 6. Explanations of the same elements from the first embodiment may be omitted or not repeated. FIG. 4 shows an exploded view of an electromechanical actuator 1 according to a second embodiment of the present invention. FIG. 5 shows a perspective sectional view of the electromechanical actuator 1 according to the second embodiment of the present invention, and FIG. 6 shows a further perspective sectional view of the electromechanical actuator 1 according to the second embodiment of the present invention. In FIG. 6, the rotor 2 and the cover 15 are omitted for ease of visualization, or the actuator 1 is shown in section accordingly.

In the present embodiment, the rotor 2 and the stator 3 form an axial flux machine. The rotor 2 is arranged along its axis of rotation 7 on the stator 3 or above the stator 3.

For this purpose, the rotor 2 has an iron core 28, which is substantially disc-shaped and comprises the rotor gearwheel 11 in one piece, in particular integrally. The rotor gearwheel 11 of the present embodiment has a substantially similar shape to the drive pinion 17 in the first embodiment. In this case, the rotor gearwheel 11 projects along the axis of rotation 7 of the rotor 2 from a surface 33 opposite the stator into a space which is circumferentially partially enclosed by the stator 3 in order to reach the rack 12 of the slider element 5, which projects into this stator space through the recess 4.

Furthermore, as can be seen in FIG. 4, the rotor 2 has a ring-shaped arrangement of rotor magnets 24 on a surface 33 opposite the stator 3 with respect to its axis of rotation 7 (with respect to a longitudinal direction of the stator 3). The rotor magnets 24 are designed in the form of ring plates, i.e. as a ring that is thin with respect to the axis of rotation 7. This embodiment has the particular advantage that the size of the actuator 1 can be reduced, especially perpendicular to the axis of rotation 7 (perpendicular to the longitudinal direction, i.e. length and width). As an alternative to the ring plate-shaped design of the rotor magnets 24, the rotor 2 can have a spoke design of rotor magnets, wherein the rotor 2 is designed as a rotor pack with inserted/buried permanent magnets.

The stator 3 has a stator winding 29, a stator iron circuit 30 and the circuit board 16, wherein the circuit board 16 in the present embodiment (see FIG. 5) is arranged between the stator winding 29 and the stator iron circuit 30. More precisely, the stator iron circuit 30 has a base plate 32, which is annular in the present example, and a plurality of stator teeth 31, which extend along the axis of rotation 7 of the rotor 2 perpendicularly from the base plate 32 in the direction of the rotor 2. The stator winding 29 wraps around the stator teeth 31. The circuit board 16 is arranged along the axis of rotation 7 between the base plate 32 and the stator winding 29 and is electrically connected to the stator winding 29 to control and energize it.

In this embodiment, the stator 3 also has the recess 4. In the present embodiment, the recess 4 is formed by at least one stator tooth 31 being omitted in the stator 3. In this embodiment, exactly one stator tooth 31 is omitted. With the exception of the recess 4, the stator teeth 31 are evenly distributed along the circumferential direction 10 of the stator 3. As described above with reference to the first embodiment, the stator 3 in the present embodiment can also have a plurality, in particular two, particularly preferably two opposite recesses 4. These additional recesses 4 can be formed by omitting further stator teeth 31.

Furthermore, no stator winding 29 is formed at the corresponding location of the recess 4. The base plate 32 is formed continuously at the location of the recess 4, i.e. it is not interrupted. The circuit board 16 is also formed continuously at the location of the recess 4, i.e. it is not interrupted. The stator 3 of the present embodiment, in particular the stator iron circuit 30 of the stator, is thus also rotationally asymmetrical with respect to the axis of rotation 7 of the rotor 2, while the rotor 2 is rotationally symmetrical with respect to its axis of rotation 7.

The slider element 5 thus protrudes along a radial direction 6 through the recess 4 of the stator, formed by an omission of a stator tooth 31 and a corresponding part of the stator winding 29.

The stator 3 causes the rotor 2 to rotate by the stator winding 29 and the rotor magnets 24. Rotor bearings 37 support the rotor 2 with respect to the housing 14 and with respect to the cover 15. The rotation of the rotor 2 is converted by the rotor gearwheel 11 directly into a lifting movement (back-and-forth movement along a radial direction 6) 34 of the slider element 5 by the meshing teeth of the rotor gearwheel 11 and the rack 12 of the slider element 5. As shown in FIG. 6, the rack 12 of the slider element 5 is mounted by the counter bearing 20 and pressed against the rotor gearwheel 11. As can be seen in FIG. 6, the rack 12 is designed in such a way that the slider element 5 is arranged along a radial direction, in particular coaxially with a radial direction.

This enables a particularly compact design of the actuator 1. Furthermore, this also enables the actuator 1 to be better scalable for higher requirements, for example higher forces due to the slider element 5 or for longer slider elements 5. In other words, the actuator 1 can also be provided for higher requirements without increasing its size excessively.

Figure 7:
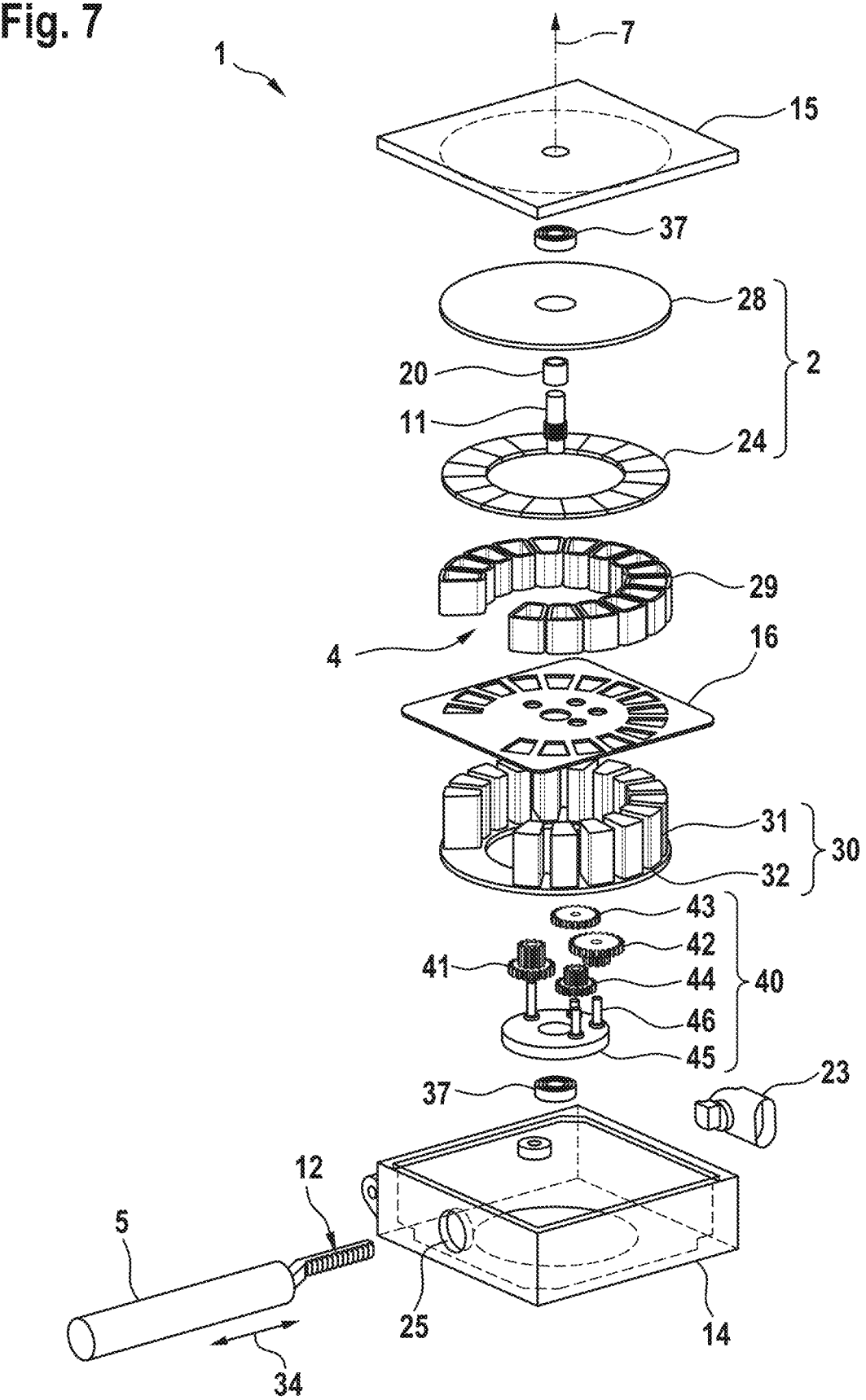
FIG. 7 shows an exploded view of an electromechanical actuator according to a third embodiment of the present invention.
Figure 8:
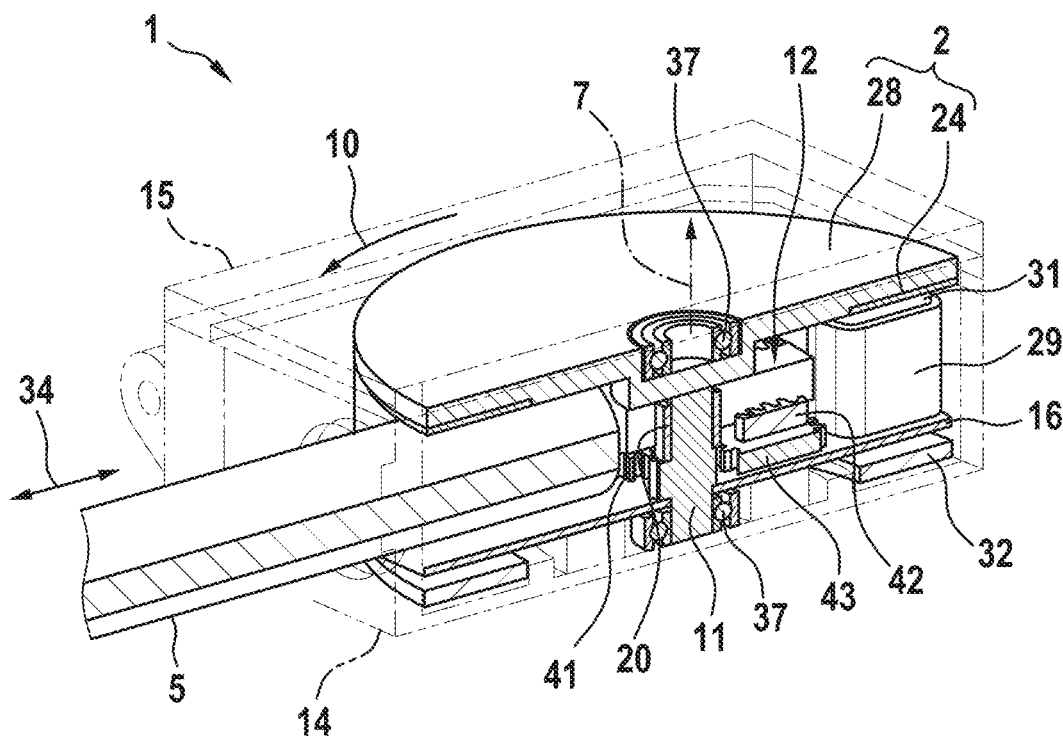
FIG. 8 shows a perspective sectional view of the electromechanical actuator according to the third embodiment of the present invention.
Figure 9:
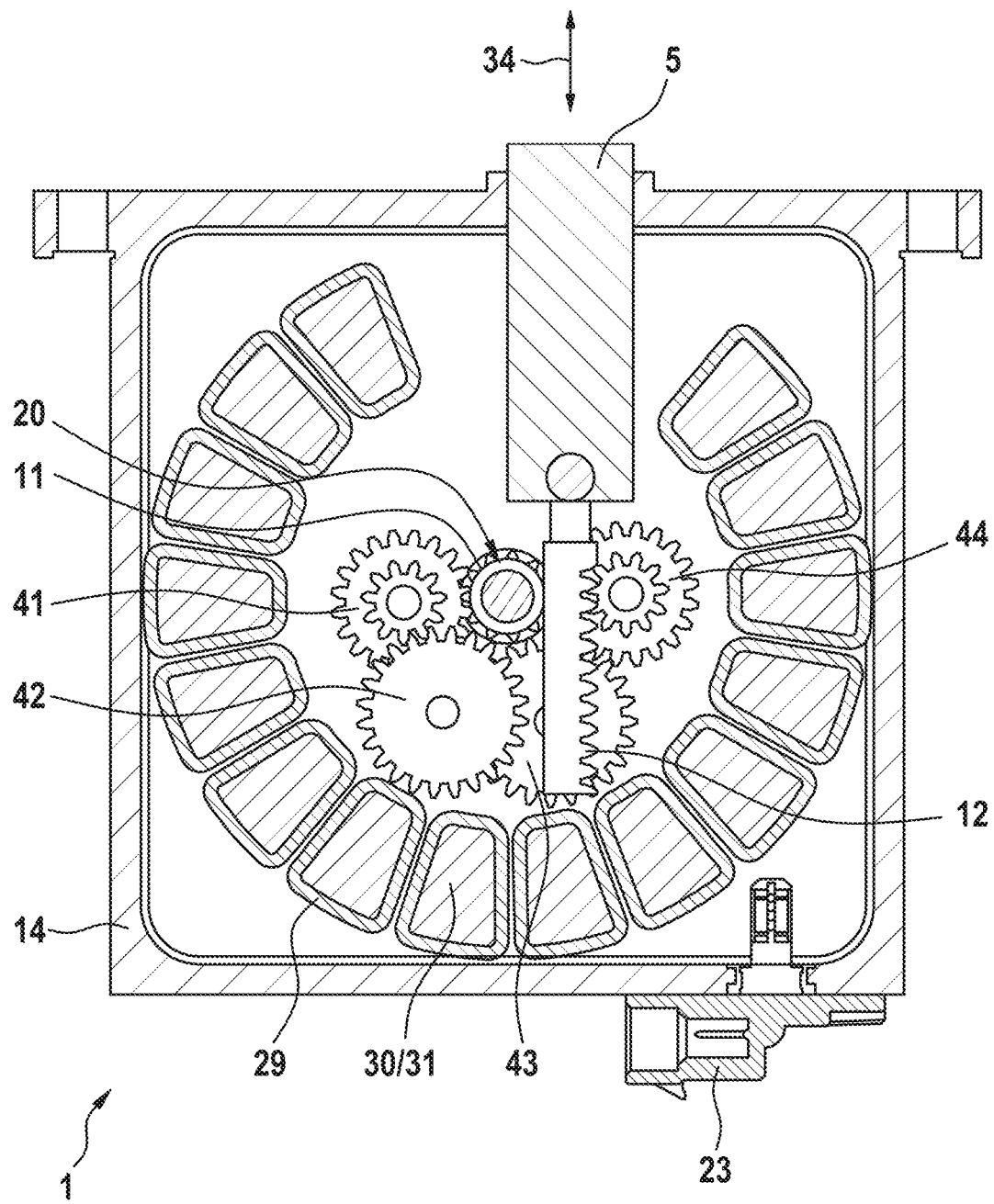
FIG. 9 shows a further sectional view of the electromechanical actuator according to the third embodiment of the present invention.

A third embodiment of the present invention is explained below with reference to FIGS. 7 to 9. Explanations of the same elements from the first or second embodiment may be omitted or not repeated. FIG. 7 shows an exploded view of an electromechanical actuator 1 according to a third embodiment of the present invention. FIG. 8 shows a perspective sectional view of the electromechanical actuator 1 according to the third embodiment of the present invention, and FIG. 9 shows a sectional view of the electromechanical actuator 1 according to the third embodiment of the present invention. In FIG. 9, the rotor 2 and the cover 15 are omitted for ease of visualization, or the actuator 1 is shown in section accordingly.

In the present embodiment, similar to the second embodiment, the rotor 2 and the stator 3 form an axial flux machine. The rotor 2 is arranged along its axis of rotation 7 on the stator 3 or above the stator 3.

Furthermore, the electromechanical actuator 1 according to the present embodiment has a spur gearing 40, which is explained below with reference to FIGS. 7 to 9. In the present embodiment, the spur gearing 40 is a multi-stage gearing.

As can be seen in particular from FIG. 7, the spur gearing 40 has a spur gearing carrier 45. Four spur gears 41-44 are each mounted on corresponding journals 46 on this carrier 45. As can also be seen in FIG. 8, the spur gearing 40 is accommodated in the space partially enclosed by the stator 3 (due to the recess 4).

As in the above embodiments, in this embodiment the slider element 5 projects through the recess 4 along a radial direction of the stator 3. In the present embodiment, the slider element 5 is aligned and arranged parallel to a radial direction of the stator 3.

With reference to FIGS. 8 and 9, a functional principle of the spur gearing 40 is explained below. Due to the perspective sectional view in FIG. 8, the fourth spur gear 44 (explained further below) is not visible.

The rack 12 of the slider element 5 is supported by the counter bearing 20 and pressed against the rotor gearwheel 11.

As explained above, the stator 3 causes the rotor 2 to rotate, wherein rotor bearings 37 support the rotor 2 with respect to the housing 14 and the cover 15. The rotation of the rotor 2 is transmitted by the rotor gearwheel 11 to the spur gearing 40 and thereby to the slider element 5, as explained below.

The rotor gearwheel 11 meshes with a first spur gear 41, in this case with a larger outer circumference (compare with FIG. 7), which causes the first spur gear 41 to rotate. The first spur gear 41 engages, here with a smaller outer circumference, in a second spur gear 42, which is thus rotated. The second spur gear 42, here with a smaller outer circumference, engages with a third spur gear 43, which is thus also rotated. The third spur gear 43 engages, in this case with the same outer circumference, in a fourth spur gear 44. The first spur gear 41, the second spur gear 42 and the fourth spur gear 44 are double gears, while the third spur gear 43 is a single gear.

The smaller outer circumference of the fourth spur gear 44 engages directly in the rack 12 of the slider element 5, thus converting a rotation of the rotor 2 into a lifting movement/back-and-forth movement 34 of the slider element 5 by means of the spur gearing 40.

In addition to the advantages explained above, the present axial flux machine with spur gearing 40 offers the following advantages. The multi-stage spur gearing 40 brings about an adjustment of the mechanical power to a more favourable operating range (higher speed, lower torque) for the actuator 1 (or rotor 2, stator 3), thereby increasing its power density. This higher power density in turn means that an active material volume (e.g. comprising copper, iron, magnets, etc.) can be reduced so that the spur gearing 40 can be arranged in the enclosed space explained above. This reduces the size of the actuator 1 while maintaining the same performance, thus enabling a wider range of applications. By reducing the active material volume, which is more cost-intensive than the spur gearing 40, the costs for the actuator 1 are reduced.

Overall, the present embodiment achieves a comparatively high power density with a compact design and reduced costs.

Figure 10:
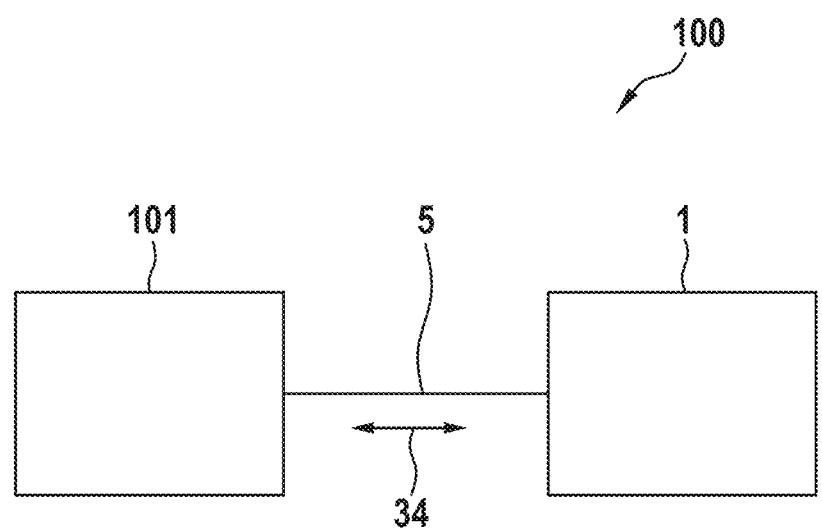
FIG. 10 shows a schematic block diagram of an actuator-valve unit according to an embodiment of the present invention.

FIG. 10 shows a schematic block diagram of an actuator-valve unit 100 according to an embodiment of the present invention.

The actuator-valve unit 100 has the actuator 1 according to the first embodiment or the second embodiment or the third embodiment. Furthermore, the actuator-valve unit has a valve 101. The valve 101 is at least partially closed and/or opened by the stroke movement 34 of the slider element 5 of the actuator 1. In other words, the slider element 5 in the actuator-valve unit 100 advantageously functions as a valve slide.

In addition to the above written description of the invention, explicit reference is hereby made to the graphic representation of the invention in the figures for its supplementary disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

LIST OF REFERENCE SIGNS 1 electromechanical actuator (actuator)
2 rotor
3 stator
4 recess
slider element
6 radial direction
7 axis of rotation
8 cover surface
9 inside
10 circumferential direction
11 rotor gearwheel
12 rack
14 housing
15 cover
16 circuit board
17 drive pinion
18 planetary gears
19 planet carrier
20 counter bearing
21 planetary gearing
22 ring gear
23 device plug
24 rotor magnets
25 opening
26 outer circumferential surface
27 opposite side
28 iron core
29 stator winding
30 stator iron circuit
31 stator tooth
32 base plate
33 opposite area
34 lifting movement/back-and-forth movement
35 stator centre
36 pinion bearing
37 rotor bearing
38 second recess
40 spur gearing
41 first spur gear
42 second spur gear
43 third spur gear
44 fourth spur gear
45 spur gearing carrier
46 journal
100 actuator-valve unit
101 valve

What is claimed is:

1. An electromechanical actuator, comprising:
a housing;
a rotor located within the housing;
a stator located within the housing, the stator having a recess; and
at least one slider element partially protruding out from the housing, which is operatively connected to the rotor and is moved by rotation of the rotor, wherein
the slider element projects at least partially into the recess along a radial direction of the stator when the actuator is in operation and/or idle.

2. The electromechanical actuator according to claim 1, wherein the stator is rotationally asymmetrical with respect to an axis of rotation of the rotor.

3. The electromechanical actuator according to claim 1, wherein the rotor is rotationally symmetrical with respect to its axis of rotation.

4. The electromechanical actuator according to claim 1, wherein the stator has a plurality of stator teeth on an annular, base plate, wherein the stator teeth are evenly distributed along a circumferential direction of the stator, and wherein the stator has no stator tooth in the recess.

5. The electromechanical actuator according to claim 1, wherein a connection between the rotor and the slider element is designed to convert a rotation of the rotor during operation of the actuator into a back-and-forth movement of the slider element along a radial direction of the stator through the recess.

6. The electromechanical actuator according to claim 5, wherein the rotor has a rotor gearwheel and the slider element has a rack which is connected to the rotor gearwheel.

7. The electromechanical actuator according to claim 6, wherein the rack of the slider element is connected to the rotor gearwheel by a planetary gear or by means of a spur gear.

8. The electromechanical actuator according to claim 1, wherein the rotor and the stator form a radial flux machine, in which the rotor is arranged radially inside the stator.

9. The electromechanical actuator according to claim 1, wherein the rotor and the stator form an axial flux machine, in which the rotor is arranged along its axis of rotation on the stator.

10. An actuator-valve unit, comprising at least one valve and an electromechanical actuator according to claim 1, wherein the at least one slider element of the actuator is connected to the valve.

* * * * *